United States Patent [19]
Wurtz

[11] 4,306,978
[45] Dec. 22, 1981

[54] METHOD FOR LIME STABILIZATION OF WASTEWATER TREATMENT PLANT SLUDGES

[75] Inventor: William O. Wurtz, Paramus, N.J.

[73] Assignee: Willow Technology, Inc., Paramus, N.J.

[21] Appl. No.: 167,864

[22] Filed: Jul. 14, 1980

[51] Int. Cl.³ .................................................. C02F 11/14
[52] U.S. Cl. ................................... 210/750; 210/738; 210/751; 210/769; 71/12; 110/346
[58] Field of Search ............... 71/12, 13, 36; 110/342, 110/346; 210/609, 710, 711, 718, 768, 769, 771, 783, 198 R, 208, 738, 750, 751, 764

[56] References Cited

U.S. PATENT DOCUMENTS

| | | | |
|---|---|---|---|
| 918,744 | 4/1909 | Fryklind | 71/12 |
| 2,026,969 | 1/1936 | Flynn | 210/771 |
| 2,723,954 | 11/1955 | Young | 71/12 |
| 3,476,683 | 11/1969 | Liljegren | 71/12 |
| 3,941,357 | 3/1976 | Wurtz | 366/91 |
| 4,012,277 | 7/1978 | Wall | 110/245 |
| 4,076,620 | 2/1978 | Opferkuch et al. | 210/711 |
| 4,142,971 | 3/1979 | LeFur et al. | 210/783 |
| 4,226,712 | 10/1980 | Kamei | 210/711 |
| 4,270,279 | 6/1981 | Roediger | 210/609 |

Primary Examiner—Peter A. Hruskoci
Attorney, Agent, or Firm—Allison C. Collard; Thomas M. Galgano

[57] ABSTRACT

A method for the lime stabilization of wastewater sludge, includes the steps of dewatering sludge so as to produce a sludge cake containing from about 10 to 60% by weight of dry solids and rapidly and intimately mixing and reacting the sludge cake with calcium oxide so as to produce stabilized sludge pellets. An apparatus for performing the process is also provided.

5 Claims, 3 Drawing Figures

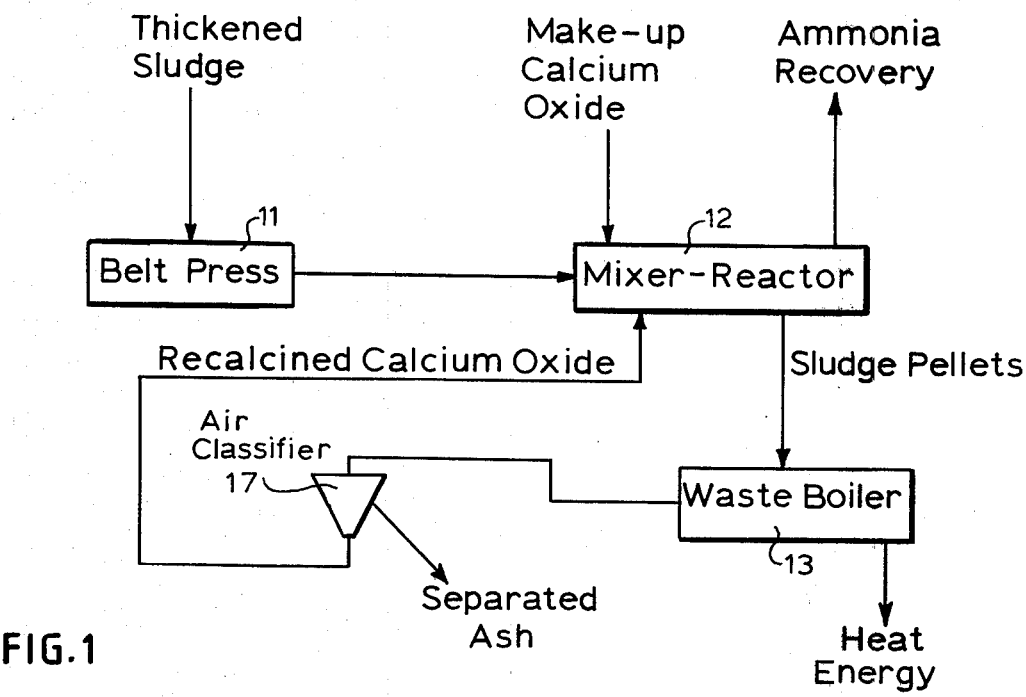
FIG.1 Flow Diagram for Incineration of Sludge Pellets
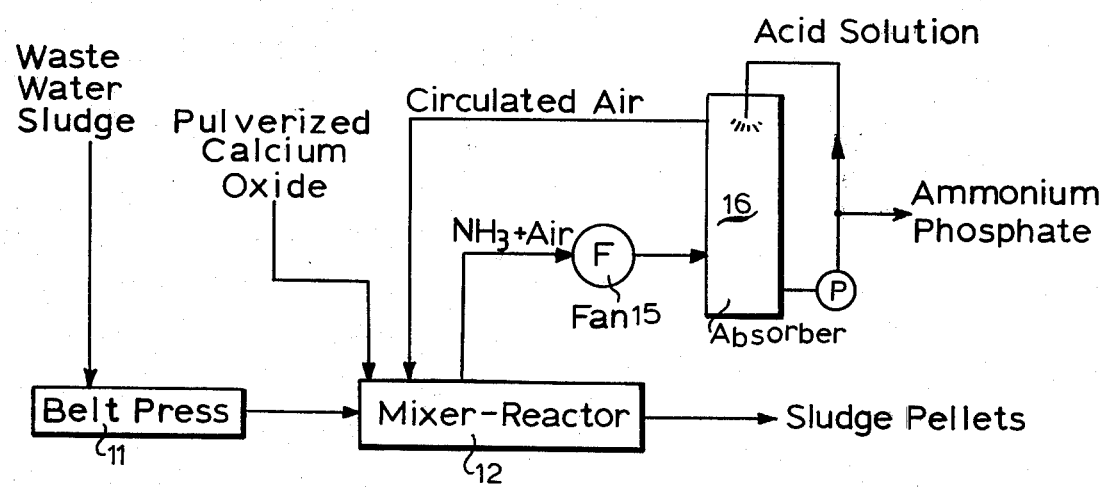
$(CaO) + (Sludge Water) = (CaOH_2 / Sludge Pellets) + (NH_3) + (Heat)$
Flow Diagram for Ammonia Recovery
FIG.3

Flow Diagram for Clean Burning of High Sulphur Coal and Co-Incineration of Sludge, Coal, and Refuse

METHOD FOR LIME STABILIZATION OF WASTEWATER TREATMENT PLANT SLUDGES

The present invention relates to a method for the lime stabilization of wastewater treatment plant sludge. More specifically, the present invention relates to a method of reacting calcium (e.g., quicklime) with dewatered wastewater sludge cake in a high intensity reactor for disinfection, stabilization and disposal of the wastewater sludge in a cost effective and environmentally acceptable manner.

Raw sludge contains large quantities of microorganisms, mostly fecal in origin. Many of these microorganisms are pathogenic and potentially hazardous to humans. Sludge handling is responsible for 30-40% of the capital cost of a treatment plant and about 50% of the operating costs. Regulatory agencies are now imposing strict regulations on the disposal of sludge, and solutions are urgently sought for better stabilization and disposal methods which are reliable and economical so as to render sludge either inert or stable.

Historically, lime has been used to treat nuisance conditions such as those resulting from open pit privies. However, prior to 1970, very little quantitative information and technical data were available on the reaction of lime with sludge for stabilization and disposal purposes. In the past 10 years, lime stabilization has been proven to be an effective sludge disposal alternative.

A review of stabilization and disinfection of municipal wastewater treatment plant sludges, using lime stabilization, prepared by the United States Environmental Protection Agency, concludes that lime stabilization has been demonstrated to effectively eliminate odors, improve bacterial and pathogenic organism control, provide stable material for application to agricultural land, and provide alternate or supplementary treatment for existing facilities which are out of service due to overload, cleaning or repair.

In an EPA publication entitled "Sludge Treatment and Disposal", EPA-625/4-78-012, dated October, 1978, the latest technology for lime stabilization of wastewater sludge is described. In addition to case histories, design considerations and conceptual design drawings are offered for lime stabilization facilities for treatment plants of varying sizes. In all cases, lime is handled and prepared as a milk of lime slurry from either hydrated lime or quicklime. When using quicklime, slaking equipment is additionally required.

For example, a typical treatment process is as follows: Sludge is pumped to a mix tank with a two hour detention time. A mechanical turbine agitator mixes the sludge with the milk of lime slurry. The treated sludge is thickened in a sludge thickener and is finally pumped to either a lagoon, or alternatively, to a tank truck for disposal away from the sewage treatment plant premises.

It should be noted that in existing designs, the sludge and the lime are handled as liquids. While it has been demonstrated that the aforementioned lime stabilization systems are substantially lower in capital equipment as well as operating costs as compared to alternate existing treatment methods, there remain many limitations and disadvantages when compared with the new inventive method, as hereinafter described.

A severe limitation of present methods is the inability to handle sludges having dry solids contents exceeding 15%. Above 15% solids, the sludge is in the form of a difficult-to-handle wet cake. Therefore, advantage cannot be taken of the new belt filter presses, such as the Parkson Magnum Press (sold by the Parkson Corporation, 5601 N.E. 14th Ave., Fort Lauderdale, Fla.) which has the proven capability of dewatering sludge from 20% dry solids to 45% dry solids depending on the type and nature of the sludge. The advantage of high dry solids content sludges is that trucking costs for disposal are drastically reduced and the sludge is in a condition for incineration. Unfortunately, lime cannot be added to the sludge as a milk of lime slurry prior to introduction into the belt press since the lime slurry will pass right through the filter belt and lose its effectiveness for stabilization. Therefore, to take advantage of the relatively dry sludge cake discharged from belt presses, means are required to efficiently and accurately mix and react the sludge cake with lime. This is also troublesome because high solids content sludges are extremely difficult to handle. They are thixotropic in nature, fibrous and abrasive.

Accordingly, it is an object of the invention to provide a novel method for the lime stabilization of wastewater treatment plant sludges.

It is a further object of the invention to provide a novel method for reacting calcium oxide with dewatered, wastewater sludge cake in a high intensity reactor for disinfection, stabilization and disposal of the wastewater sludge in a cost effective and environmentally acceptable manner.

It is a more particular object of the invention to provide such a novel method which effects the lime stabilization in such a manner so as to form pellets which result in ease of material handling and ease of briquetting and further process steps of coking for production of a fuel gas.

It is also an object of the present invention to provide such a novel method which prepares the sludge for incineration, co-incineration, pyrolysis or co-pyrolysis for energy conservation and which also kills bacteria and pathogens so that the sludge in pelletized form is suitable as a fertilizer or soil conditioner.

It is yet another object of the invention to provide such a novel method which provides alternate means of sludge treatment during the period when existing sludge handling facilities, such as anaerobic or aerobic digesters, are out of service for cleaning or repair and which also serves to supplement an existing sludge handling facility because of excess sludge quantities above design maximums.

It is a still further object of the invention to provide such a novel method which serves to upgrade existing or new facilities with improved odor, bacterial and pathogenic organism control, while providing simplicity of design with resultant reduction of capital equipment and operating costs as compared to present treatment methods and apparatus.

Certain of the foregoing and related objects are readily attained in a method for the lime stabilization of wastewater sludge, which comprises the steps of dewatering sludge so as to produce a sludge cake containing from about 10 to 60% by weight of dry solids and mixing and reacting this sludge cake with calcium oxide, preferably in the form of lime and, in particular, quicklime, so as to produce stabilized sludge pellets.

Preferably, lime is added in an amount of 2 to 40% by weight based upon the weight of the sludge. Most advantageously, the mixing and reacting steps have a duration of less than a minute and, preferably, less than 30 seconds.

Most advantageously, the method additionally includes the step of recovering ammonia during the mixing and reaction step. It is also desirable that it includes the step of burning the sludge pellets in a furnace, recovering calcium oxide from the ash of the furnace, and recycling the calcium oxide to the mixer.

Certain of the foregoing and related objects are also readily attained in an apparatus for the lime stabilization of wastewater sludge which includes means for dewatering sludge so as to produce a sludge cake containing from about 10 to 60% by weight of dry solids and means for mixing and reacting the sludge cake with lime so as to produce stabilized sludge pellets.

In a preferred embodiment, the means for dewatering is a belt press and the means for mixing and reacting includes a pair of spaced-apart shafts pivotably disposed in a container, which define a zone of interaction between the axes thereof and a plurality of double-wedge working tools, each comprising two substantially triangular planes inclined relative to each other and connected at one edge thereof, with the working tools being connected to the periphery of each shaft in spaced-apart relationship so as to overlap in the zone of interaction. Drive means are coupled to each of the shafts for moving the shafts and the working tools oppositely with respect to each other so that adjacent working tools of the shafts co-act in mixing the material.

Other objects and features of the present invention will become apparent from the following detailed description when taken in connection with the accompanying drawings which disclose several embodiments of the invention. It is to be understood that the drawings are designed for the purpose of illustration only, and are not intended as a definition of the limits of the invention.

In the drawings, wherein similar reference characters denote similar elements throughout the several views:

FIG. 1 is a flow diagram for the production and incineration of sludge pellets according to the present invention;

FIG. 3 is a flow diagram for clean burning of high sulphur coal and co-incineration of sludge, coal and refuse according to the present invention.

Figure 2:
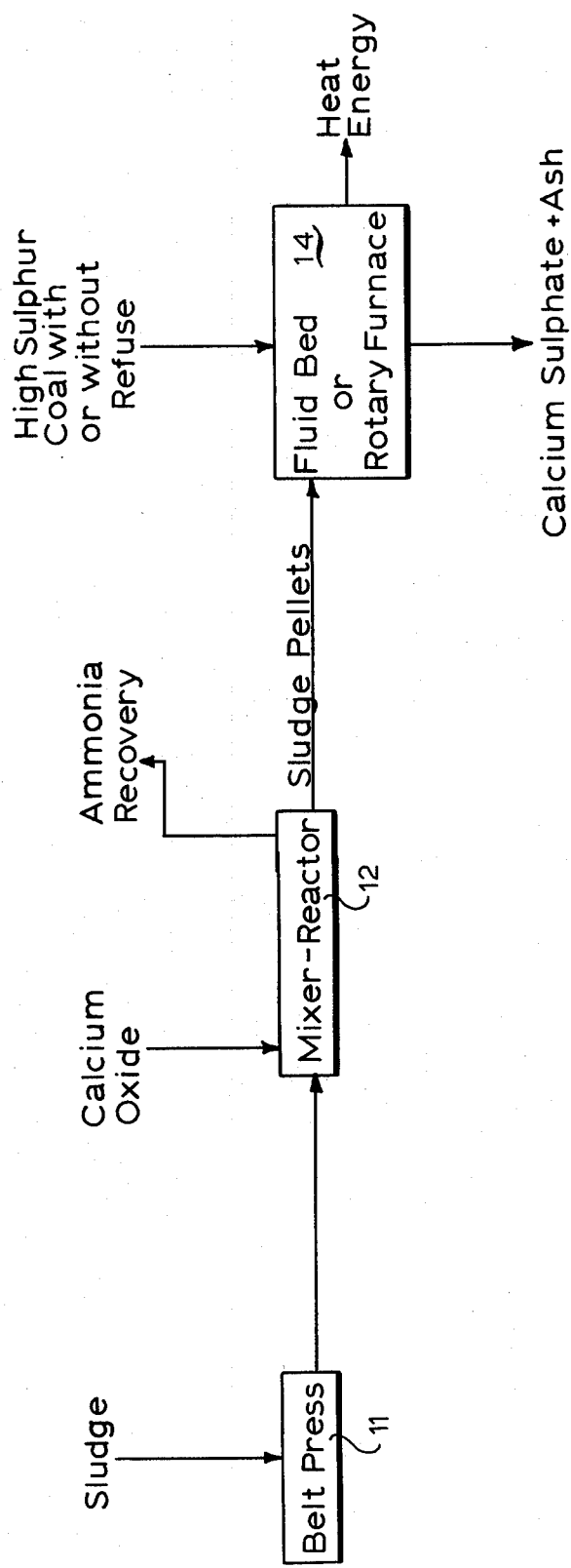
FIG. 2 is a flow diagram for ammonia recovery according to the present invention.

Turning now in detail to the drawings, FIGS. 1–3 illustrate three possible sludge treatment systems embodying the present invention. In each case, the sludge is initially fed to a dewatering apparatus, preferably a belt press 11, so as to effect dewatering thereof and produce a relatively dry sludge cake containing from about 10 to 60% dry solids. Also suitable are, e.g., plate and frame filters, vacuum filters, centrifuges or other conventional dewatering devices.

The dewatered sludge cake is then fed to a mixer-reactor 12 to which lime, i.e., calcium oxide, in the form of e.g., quicklime or hydrated lime, is also fed so as to effect an efficient and accurate mixing and reacting of the sludge cake with the lime so as to effect lime stabilization thereof. This reaction is advantageously and efficiently accomplished rapidly, such as in a high intensity blender-dryer-reactor invented by the applicant and described in U.S. Pat. No. 3,941,357, the subject matter of which is incorporated herein by reference thereto.

This reactor has the ability to rapidly disperse granular or powdered quicklime in the sludge cake so as to permit a chemical reaction with the free water contained therein. Due to the unique action of the reactor's mixing tools, the sludge is rapidly formed, within about a 30 second period, into small generally spherical agglomerates or pellets which are easily handled in downstream processing equipment. Additionally, as reported by the EPA, the resultant high pH, in itself, destroys bacteria and pathogenic organisms in the sludge. Coupled with the high pH is a rise in temperature to 95° to 100° C. as a result of the exothermic chemical reaction between calcium oxide and free water. This high temperature ruptures the microorganisms releasing additional water for reacting with the lime and insures the destruction of microorganisms both through high temperatures, as reported by the EPA, and through rupture of the microorganisms, the latter of which is caused by the inventive mixer.

As previously mentioned, dewatered sludge cake containing from 15 to 60% dry solids is a very difficult material to handle because of its thixotropic nature, high fiber content, abrasive nature and its tendency to adhere to and build up on the walls of the processing equipment. However, by use of the high speed mixer-reactor, the quicklime may be reacted quickly with the sludge cake so as to allow for efficient operation with little, if any, build-up on the walls of the reactor.

The mixer-dryer-reactor is preferably operated in a continuous rather than batch-wise mode, i.e., continuous charging at one end and continuous discharging at the other end. It is preferably a double arm mixer-reactor having a container with a pair of spaced-apart main shafts horizontally disposed through the container and a plurality of plowshare-like mixing tools connected to the periphery of each main shaft in a spaced-apart relationship. The device was originally designed to mix extremely heavy viscous materials and to incorporate fillers and fibers, such as asbestos, glass fibers or sisal, into such very heavy, viscous materials.

The operating principle of the machine is one of mechanically dividing and separating individual particles in the free space of the machine. The lifting and separating action of the plowshare-like working tools tend to mechanically fluidize materials since the plowshare working tools are rotating at speeds which are twice or three times that of conventional mixers. One plowshare assembly overlaps and wipes the opposing plowshare assembly, thereby insuring uniform recirculation of all materials and uniform shear force on all particles.

The characteristics of separating and fluidizing materials are extremely important to accomplish the objects of the new method. The surface area of the sludge fibers are quickly exposed for coating and reacting with calcium oxide. Particles are also caused to rotate as they are acted upon by the plowshare-like working tool, thereby creating pellets of a uniform size. As the pulverized calcium oxide removes the surface water from the pellets, they tend to separate, forming distinct, easy to process, spherical agglomerates, as previously indicated.

The quantity of lime to be added for reaction purposes is dependent on the quality of the lime and composition of the sludge cake. First, the lime can vary in composition depending on where it is mined. It could contain some magnesium oxide which will also slake, but more slowly. It will also contain a percentage of inert material. Secondly, the sludge cake will vary in composition and water content depending upon the type of sludge, e.g., primary, secondary, mixed, digested, waste activated, etc. It will also vary in composition depending upon the chemical plant and other processing wastes dumped into the municipal system. Lastly, it will vary depending on the equipment used for dewatering.

Typically, one would add enough calcium oxide to raise the pH to 11 and increase the temperature to 170° to 210° F.; the combination of the heat generated by the exothermic reaction and the high alkalinity serving to sterilize the sludge cake by destroying the pathogens and bacteria. Generally, about 2 to 40% by weight of lime and, preferably, about 10 to 20% by weight of lime, is added.

The calcium oxide is usually supplied in the form of quicklime and, in particular, "crushed or pebble" lime which could include pebbles up to about 2 inches. Moreover, it is better to use "pulverized" lime so that the fine particles can immediately react with the sludge water as they are rapidly dispersed by the mixing tools; "pulverized" lime passes substantially all through a #20 sieve and 85 to 95% passes through a #100 sieve.

The water for the reaction is supplied by: (1) adhesion and capillary water; (2) intercellular or between-cell water; and (3) bound or intracellular water.

As previously mentioned, this reaction is exothermic raising the temperature to 100° C. To maintain the temperature in the reactor, a jacket is provided for cooling purposes, if necessary.

In an actual test, 10 lbs. of mixed wet sludge having an estimated dry solids content of 20% were obtained from the discharge of a belt filter press. A mixer of the type described in U.S. Pat. No. 3,941,357 was started, operating at approx. 90 rpm. 2.5 lbs. of hydrated lime were added uniformly over a 10 second period. The mixer ran for an additional 30 seconds, for a total mixing time of 40 seconds and samples were taken following 10, 20, 30 and 40 second mixing time intervals.

The results indicated that lime could be incorporated into sludge having a 20% dry solids content in as little time as 10 seconds. The 20 second sample, inspected visually, appeared to be well blended, as did the 30 second sample, and the 40 second sample appeared to be extremely well blended.

In evaluating the above results, it must be kept in mind that the sludge was relatively wet. Under normal conditions, the dry solids content of this sludge would be between 30 and 40% dry solids and under these circumstances could be more easily handled in the dual shaft plowshare blender-reactor. Also, no attempt was made to comminute the sludge to reduce particle size.

Observing the machine in operation, it was observed that the walls of the machine were clean and the sludge started to develop into small glomules. As a further test, additional lime was added after the formation of the glomules to absorb surface water with a resultant separation of the glomules into distinct spherical particles. The glomules were dusted and tended to separate. For fertilizer applications, this sludge could then be partially dried for ease of broadcasting for land application.

Based on a mixing cycle time of 20 seconds, a mixer-reactor having a working capacity of approx. 4 cu. ft. could readily handle 1,000 tons of wet sludge per day.

The resultant pellets are well suited for use as fertilizer, particularly in sandy soil or acid soils such as those found in strip mining areas. It should also be noted that nutrients can be added to the reactor to improve the value as a fertilizer.

The pellets produced have considerable surface area for contact with combustion air or heat for incineration, pyrolysis or other energy conservation uses. For example, the burning of the pellet in a conventional waste boiler 13 (see FIG. 1) or in a rotary furnace 14 (see FIG. 2) offers advantages over other types of incineration systems in that the lime in the form of calcium hydroxide will be recalcined to calcium oxide. The ash from the furnace can be air classified in a conventional air classifier 17 and the calcium oxide recycled to the mixer-reactor 12 for reaction with the sludge cake, thereby drastically reducing chemical costs; due to some loss in the separation process it will be necessary to add some additional calcium oxide, i.e., "makeup" calcium oxide, to the reaction (see FIG. 1).

As shown in FIG. 2, the pellets could also be charged to a fluid bed or rotary furnace 14 burning high sulphur coal. The sludge is additional fuel while the lime reacts with $SO_2$ gas forming calcium sulfate, so as to thereby produce a more clean burning coal.

In pellet form, the sludge cake can also be readily briquitted or briquetted with other materials for subsequent coking of these briquettes and the subsequent production of a fuel gas.

Furthermore, as best illustrated in FIG. 3, it is also advantageous to recover ammonia from the wastewater, the ammonia resulting from the known nitrogen compounds in wastewater. Not only is the ammonia valuable in the form of an ammonia salt, but nitrogen is removed from the waste thereby eventually minimizing or eliminating eutrophication when disposing of wastes.

The conditions for effective removal of nitrogen are present in the inventive method of reacting quicklime with the sludge cake. In water, ammonia dissociates to the ammonium ion as follows:

$$NH_3 + H_2O \rightleftharpoons NH_4^+ + OH^-$$

The undissociated ammonia can be stripped off, and this stripping is favored by high pH and temperature, conditions which are present in the reactor. It is reported that the quantity of undissociated ammonia is expressed by $$[NH_3] = \frac{[NH_3] + OT}{1 + \frac{10 - pH}{Ka}}$$

where the equilibrium constant Ka depends on temperature. In the reactor, practically all of the nitrogen compounds exist in the ammonium-ion form. As mentioned previously, the reactor forms and mechanically fluidizes sludge pellets, exposing surface area to circulated air in the reactor desorbing ammonia. The circulated air-ammonia mix is directed by a fan 15 to an absorber 16 consisting of a conventional scrubber or tower scrubbing with an acid solution, preferably phosphoric acid solution, forming an ammonia salt, preferably ammonium phosphate, which can be sold separately or returned to the reactor to be incorporated in the pellet.

This simplified apparatus consisting of a belt press, a reactor and other accessory handling equipment, can be readily set up in emergency situations for aiding or supplementing existing treatment plants.

In eliminating slaking equipment, pumping equipment, large reaction tanks, turbine agitators, sludge pumping equipment, sludge thickeners and recognizing that relatively dry pellets can be trucked for disposal at low trucking costs, it is apparent that the new method and system greatly reduces the capital, equipment, operating and maintenance costs of facilities for treatment of wastewater plant sludges.

Various modifications and changes may, of course, be made as will be apparent to those skilled in the art. As an example, although applicant's patented mixer-reactor has been found to be extremely suitable and highly advantageous to use, in comparison to conventional mixers, other suitable and functionally equivalent mixers may eventually be found which afford an intimate and thorough mixing of the materials in a short period of time as accomplished by applicant's patented reactor. In addition, other suitable uses may also be found for the pelletized product, produced by the invention.

Thus, while only several embodiments of the present invention have been shown and described, it will be obvious that many changes and modifications may be made thereunto, without departing from the spirit and scope of the invention.

What is claimed is:

1. A method for the lime stabilization of wastewater sludge, comprising the steps of:

dewatering sludge so as to produce a sludge cake containing from about 10 to 60% by weight of dry solids; and thereafter mechanically separating and fluidizing said sludge cake to expose the surface area thereof in a mixer-reactor, said mixer-reactor comprising a container, a pair of space-apart shafts pivotable disposed through said container, and defining a zone of interaction between the axes of said shafts, a plurality of double-wedge working tools each comprising two substantially triangular planes inclined relative to each other and connected at one edge thereof, said working tools being connected to the periphery of each shaft in spaced-apart relationship so as to overlap in the zone of interaction and drive means coupled to each of said shafts for moving the shafts and the working tools oppositely with respect to each other so that adjacent working tools of the shafts co-act in mixing said sludge cake, while simultaneously adding about 2 to 40% by weight calcium oxide thereto for a period of between about 10 and 30 seconds so as to effect rapid dispersal of said calcium oxide in said sludge cake and to effect a rapid chemical reaction of said calcium oxide with the free water contained in said sludge cake so as to thereby produce stabilized sludge pellets.

2. The method according to claim 1, wherein said calcium oxide is provided in the form of lime.

3. The method according to claim 2, wherein said lime is quicklime.

4. The method according to claim 1, additionally including the step of recovering ammonia during said mechanically separating and fluidizing step by circulating air through said sludge cake in said mixer-reactor to effect desorption of ammonia therefrom and to thereby produce an air-ammonia mix and by directing said mix to an absorber containing an acid solution for producing an ammonia salt.

5. The method according to claim 1, additionally including the steps of burning said sludge pellets in a furnace, recovering calcium oxide from the ash of said furnace, and recycling said calcium oxide to said mixer.

* * * * *